United States Patent [19]
Hahn

[11] 3,771,814
[45] Nov. 13, 1973

[54] FREE-SPOOLING RETRACTOR FOR VEHICLE OF RESTRAINT SYSTEM

[75] Inventor: Floyd Hahn, Lake View Terrace, Calif.

[73] Assignee: American Safety Equipment Corporation, New York, N.Y.

[22] Filed: May 22, 1972

[21] Appl. No.: 255,440

[52] U.S. Cl. .......................... 280/150 SB, 242/107.4
[51] Int. Cl. ............................................. B60n 21/02
[58] Field of Search ............................. 280/150 SB; 242/107.4

[56] References Cited
UNITED STATES PATENTS

| | | | |
|---|---|---|---|
| 3,692,328 | 9/1972 | Arlanskas | 280/150 SB |
| 3,604,654 | 9/1971 | Stoffel | 242/107.4 |
| 3,219,361 | 11/1965 | Brown | 280/150 SB |

*Primary Examiner*—Robert R. Song
*Attorney*—C. A. Miketia et al.

[57] ABSTRACT

A safety restraint system for use in a vehicle, such as an automobile, includes a lap strap which in the active position circumscribes the lap of an occupant on a vehicle seat the outboard end of the strap being connected to a retractor. The retractor is mounted on the lower rearward corner portion of the vehicle door adjacent the seat and is of the type commonly known as an auto-lock retractor. The retractor includes a rotatably mounted reel around which the strap is wound and from which it may be protracted, a ratchet reel mounted on the reel and rotatable therewith, and locking means including a pawl for selective engagement with the ratchet wheel. In normal operation, protraction of the strap to permit the strap to be secured around the occupant followed by slight retraction moves the pawl into engagement with the ratchet wheel to prevent further protraction thus precluding the occupant from moving forward in the event that the vehicle is in a collision. Free spooling means is provided which includes a pivotally mounted lever, one end of which is in selective engagement with the pawl to render the pawl inactivatable so that the reel will free-spool and the other end of which is engageable with a trip arm mounted on the vehicle adjacent the rearward lower end of the door. When the door is closed, the pawl is activatable and the retractor functions in its normal manner. When the door is opened, the reel is permitted to free-spool so that the strap may be protracted while the door is opening and simultaneously moving the strap to an out-of-the-way position without any active participation on the part of the occupant enabling the occupant to leave the vehicle.

6 Claims, 7 Drawing Figures

PATENTED NOV 13 1973

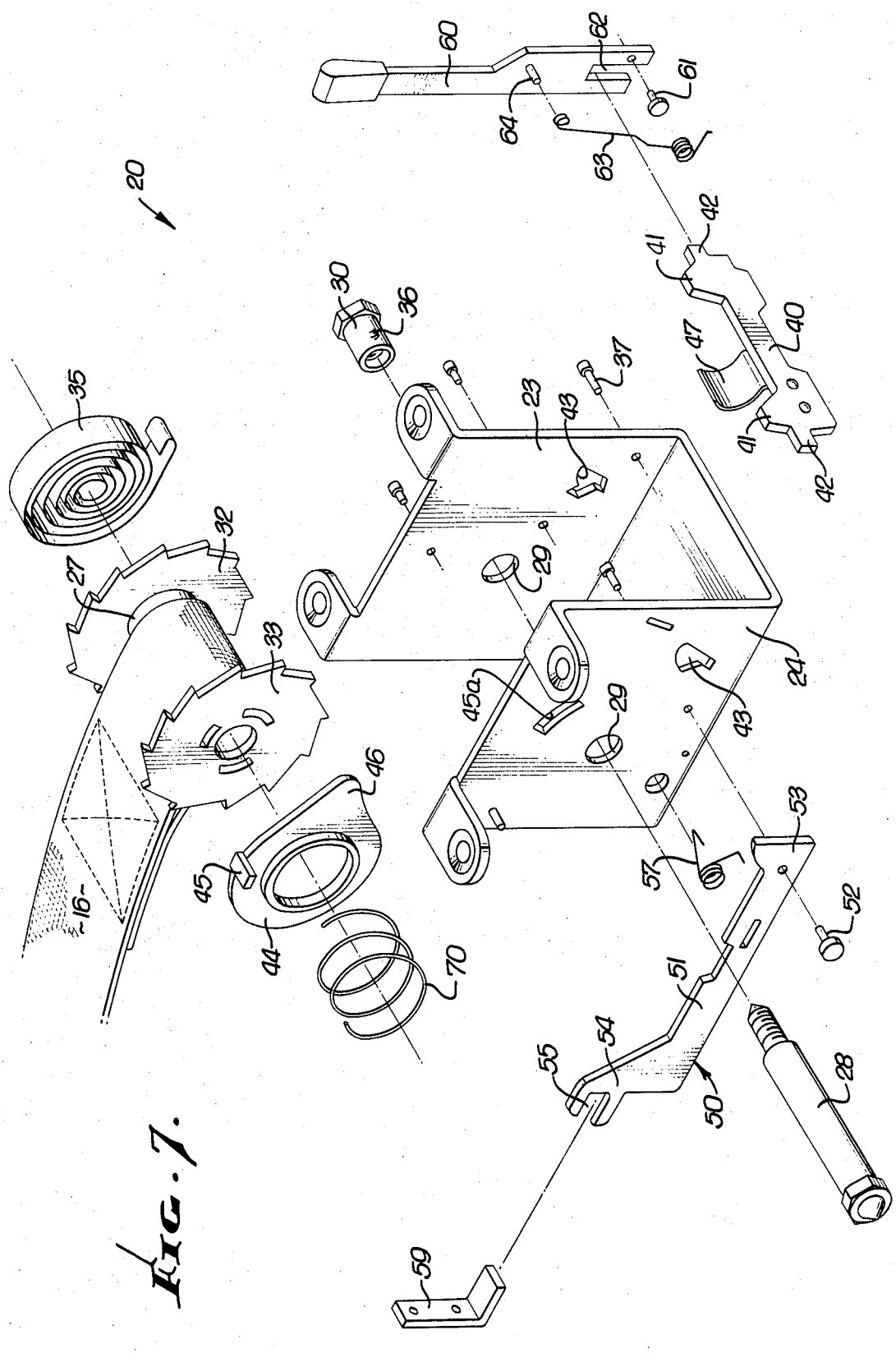

FREE-SPOOLING RETRACTOR FOR VEHICLE OF RESTRAINT SYSTEM

BACKGROUND AND PRIOR ART

The use of safety restraint systems in vehicles, such as automobiles has become prevalent in an attempt to improve the safety of such vehicles. Such restraint system commonly employs two straps, one of which may be referred to as a lap strap which circumscribes the lap of the vehicle seat occupant when in its operative condition. The lap strap prevents the lower torso of the occupant from moving forward in the event of an emergency, such as a collision, thereby preventing the occupant from being thrown against the dashboard of the automobile causing bodily injury. A shoulder strap is also commonly provided to restrain the upper torso of the occupant to prevent jack-knifing.

In the vehicle safety restraint system as described above, there is required active or volitional participation in positioning the straps about the occupant into their operative position. The difficulty with any such system is that, notwithstanding the obvious safety advantages of such system, the vehicle occupant ignores the safety advantage and will not position the straps of the system into their operative mode. There has thus arisen a great and unfulfilled need to provide a passive restraint system which will automatically provide the occupant restraint without any active participation on the part of the occupant. The term passive should be understood to mean that there is no requirement that the occupant handle, maneuver, or otherwise move elements of the safety restraint system independently of the normal movement required for an occupant to enter and be seated in the vehicle. Since entering into the vehicle requires movement of the vehicle door from a closed to an open position and then reclosing the door after the occupant is seated, the possibility exists to utilize the movement of the door to operatively position the restraint system strap.

A requirement for such system encompasses not only movement of the restraint members into their operative position after the occupant is seated, but also movement of such straps to an out-of-the-way position allowing normal ingress and engress to the interior of the vehicle during ordinary use of the automobile. Such movement involves not only convenience but is also a safety feature of the system and a rapid exit from the vehicle may be required following a collision or other emergency and it is desired that no active participation of the occupant be required prior to egress from the vehicle, particularly following an accident.

SUMMARY OF THE INVENTION

In view of the prior art described above, including the disadvantages and deficiencies of prior art vehicle restraint systems, it is an object of the present invention to provide a passive safety restraint system in which a lap strap is movable to an operative restraining position when an occupant is seated in the vehicle with the vehicle door closed and in which the strap is moved to an out-of-the-way position when the door is opened. More specifically, it is another object of the invention to provide a vehicle safety restraint system in which the outboard end of a safety strap is secured to the reel of an auto lock retractor that is mounted in the door of the vehicle and wherein the retractor is in a lockable position when the door is closed and in a free-spooling condition when the door is open.

Generally, the present invention provides in a vehicle safety restraint system including a safety strap retractor carried by the lower rearward corner portion of the door and including a reel around which a strap is wound when retracted and from which the strap may be protracted, ratchet means mounted on the reel and rotatable therewith, and locking means including a pawl selectively engageable with the ratchet wheel means to prevent further protraction of the strap after the strap is protracted and permitted to slightly retract so that the reel is in a locked condition, a free-spooling improvement to such retractor including a pivotally mounted lever one end of which is selectively engageable with the pawl, means for biasing the lever to an operative position in engagement with the pawl whereby the pawl is inactivatable, and trip means mounted on the vehicle for selective engagement with the lever to move the lever from an inoperative position wherein the pawl is activatable to an operative position (where it is maintained by the biasing means) rendering the pawl inactivatable.

BRIEF DESCRIPTION OF THE DRAWINGS:

FIG. 7 is an exploded perspective view of the retractor and free-spooling means of the present invention.

Figure 3:
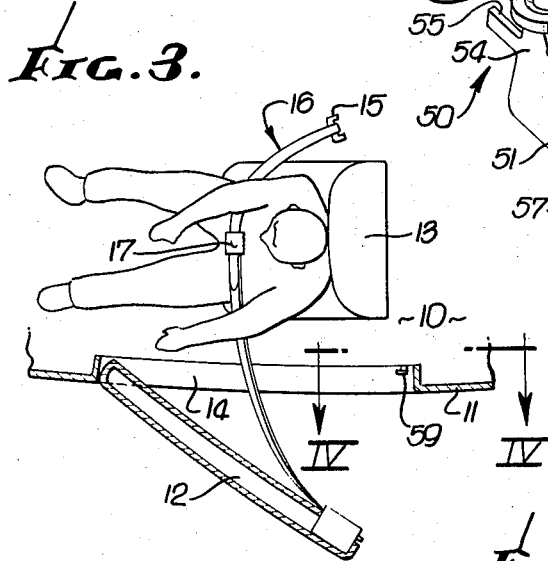
FIG. 3 is a view as in FIG. 1 showing the door in a partially open position.

DETAILED DESCRIPTION OF THE PREFERRED EMBODIMENT:

Referring now to the drawings, and more particularly to the FIGS. 1 and 3, the general configuration of the vehicle safety restraint system of the present inention will be described. Portions of the vehicle are shown such as the floor 10, the body wall 11, the door 12, and an occupant seat indicated generally at 13. As in the conventional automobile configuration, the vehicle includes a door jamb, 14 (see FIG. 3) into which the door 12 fits so that the exterior wall of the door is flush with the exterior wall 11 of the vehicle. A portion of the vehicle restraint system is shown which includes inboard anchor 15 and a lap strap 16. The lap strap may be a continuous strap, a single length of webbing, or may be provided with a buckle, such as the buckle 17 intermediate its ends, or there could be provided a buckle at the anchor end 15. Inclusion of the buckle permitting the strap to be disengaged may be provided as an additional safety factor although it obviously renders the system capable of frustration by vehicle owner who wishes to render the safety system inoperable.

Figure 1:
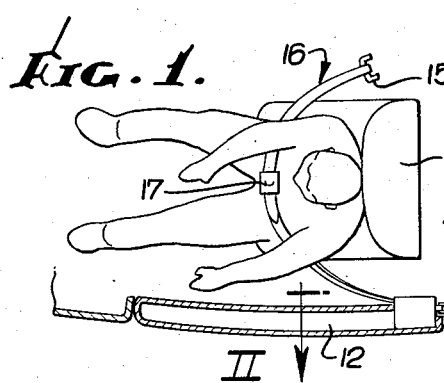
FIG. 1 is a diagramatic plan view of a vehicle safety restraint system constructed in accordance with the present invention shown with the lap strap in the operative restraint mode.

It will be noted that the door 12 is laterally adjacent the seat 13 and that the outboard end of the lap strap 16 is secured at its outboard end to the lower rearward corner portion of the door 12 so that in the position shown in FIG. 1, the strap is in an operative restraining mode. Referring to FIG. 3, the door 12 is shown partially opened and it will be seen that the outboard end of the lap strap 16 attached to the lower rearward corner portion of the door is moved laterally outwardly and forwardly as the door is opened. When the door is fully open (not shown) it will be appreciated that the outboard end of the lap strap 16 has been moved considerably outwardly and sufficiently forwardly to an out-of-the-way position enabling the occupant to exit without interference from the strap.

Figure 2:
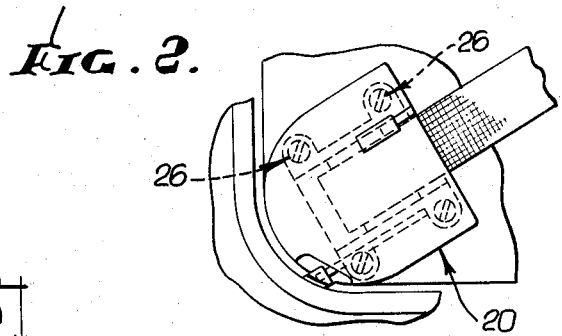
FIG. 2 is a view taken along the plane II—II of FIG. 1 showing the retractor of the present invention mounted on the lower rearward center portion of the vehicle door.

The outboard end of the strap 16 is secured to a retractor indicated generally at 20 and the system further includes a free-spooling means indicated generally at 50. The retractor 20 includes a housing, indicated generally at 21, which comprises a base 22 and a pair of side walls 23, 24. Each of the side walls 23, 24 includes mounting ears 25 for securing the retractor to the door 12 such as with fasteners 26 (see FIG. 2). With further reference to FIG. 2, it will be seen that the retractor 20 is mounted to the door 12 in the lower rearward corner of the door 12 and adjacent the door jamb 13.

The retractor 20 further includes a reel 27 (see FIG. 7) on which the strap 16 is wound when retracted and from which the strap may be unwound. The reel 27 in one embodiment of the retractor may be rotatably supported relative to the housing through a shaft 28 journaled in openings 29 in the side walls 23, 24 of the housing. The shaft 28 passes through the reel 27 and is secured against axial movement relative the housing by the nut 30 which is threadably received on one end of the shaft 28 after the shaft is passed through the side walls and reel 27. The reel also carries ratchet wheel means which may comprise a pair of ratchet wheels 32, 33. In the exemplary embodiment, such ratchet wheel are adapted to prevent rotation of the reel in one direction such as the direction which would permit protraction of the strap as will be more fully explained hereinafter. The retractor also includes a windup spring 35 which is secured at its inner end to the nut 30 by the tab 36 and at its outer end by the retainer pin 37 secured to wall 23 of the housing. The spring 35 constantly biases the reel 27 in a counterclockwise direction (as viewed in FIG. 7) so as to constantly bias the strap 16 toward full retraction.

Retractor locking means includes ratchet wheel pawl 40, engaging tabs 41 and laterally extending pivot arms 42 received in openings 43 in side walls 23, 24 for pivotal movement of the pawl. The locking means further includes the clutch plate 44 having an inner face in frictional engagement with the outer face of ratchet wheel 33 and which is biased into interfacial engagement by the compression spring 70 that bears against the opposite face of the clutch plate 44 and the inner surface of the housing side wall 24. Arcuate movement of the clutch plate 44 is restricted through a tab 45 that projects through an arcuate slot 45a in housing side wall 24 so as to limit frictionally induced rotation of the clutch plate to a small arc. The clutch plate 44 carries an integral lock out tab 46 for selective engagement with the pawl 40 in a manner to be described. The locking means also includes the belt sensor 47 which is mounted on the pawl 40 and is in selective engagement with the surface of the strap 16 during selected portions of the protraction and retraction of the belt as will be hereinafter explained.

Before proceeding to describe the free-spooling means 50, the operation of the retractor 20 will be briefly described. For a further description of the configuration and operation of the retractor 20, commonly known as an auto lock retractor, reference may be made to United States Pat. Nos. 3,174,704 and 3,550,875 which discloses a two-way locking retractor operating on the same principle as the retractor 20 of the present invention. For the purposes of describing operation of the retractor, assume that the belt or strap 16 is fully retracted and wound around the reel 27. In such initial condition, during the winding of the strap on the reel, the increasing radius of the portion of the strap wound around the reel will cause engagement with the belt sensor 47 so as to pivot the pawl 40 rearwardly (clockwise as viewed in FIG. 7) so that the pawl tabs 41 are out of engagement with the ratchet wheels 32. During such clockwise rotation of the reel when the strap is retracted, the frictional engagement between the ratchet wheel 33 and the clutch plate 44 will cause the clutch plate to move to its most clockwise position, i.e., the position at which the tab 45 is stopped by the lower end wall of the arcuate slot 45a. When the clutch plate 44 is in this position, the lockout tab 46 is interposed between the pawl tabs 41 and the ratchet wheels 32. As the strap 16 is protracted from this fully wound position, the belt sensor will permit the pawl to rotate counterclockwise toward the ratchet wheels 32, 33 as the effective diameter of the strap decreases. Before the tabs 41 can contact and engage the ratchet wheels 32, 33, the pawl will be prevented from further counterclockwise movement by the lock out tab 46 of clutch plate 44. Thus, even as the belt sensor loses contact with the strap, further protraction is permitted.

When the belt has been sufficiently extended, and is in the operative restraining position about the occupant, the belt will retract under the influence of the windup spring 35 which rotates the reel 27 counterclockwise. This counterclockwise movement of the reel will cause the clutch plate 44 to also rotate counterclockwise to its most counterclockwise position defined by the upper end wall of the arcuate slot 45a which stops the tab 45 and in this position, the lock out tab 46 will permit and will not interfere with counterclockwise movement of the pawl 40. Of course, the windup spring 35 when the belt is protracted and in operative position will constantly bias the reel toward counterclockwise rotation which is not prevented by the pawl 40 because of the unidirectional shape of the ratchet wheel teeth.

It will be appreciated that the retractor 20 as described in detail above is only exemplary of a retractor which may be employed in the present invention. It will also be understood that while the retractor has been described as including a housing 20, the door 12 may be constructed so that a portion of the door structure may provide the function of the housing.

Figure 5:
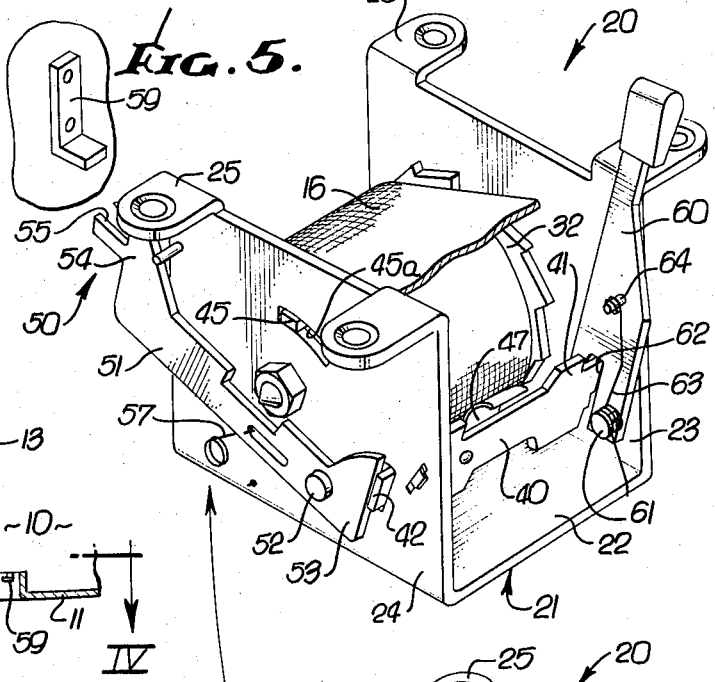
FIG. 5 is a perspective view of the retractor of the present invention together with the trip means shown in the free-spooling condition.
Figure 4:
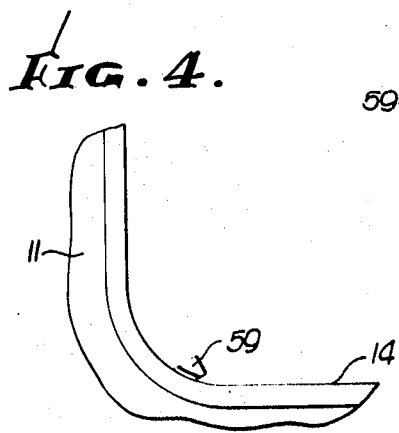
FIG. 4 is a view taken along the plane IV—IV of FIG. 3 showing the vehicle door jamb and the trip means of the present invention.

The free-spooling means of the present invention, in its exemplary embodiment, comprises a lever 51 which is pivotally mounted intermediate its ends through a pivot pin 52 to the side wall 24 of the housing 20. The end 53 of the lever 51 is positioned for selective engagement with the pivot arm 42 of the pawl 40 as may be seen best in FIGS. 5 and 6. The opposite end 54 of the lever 51 may be provided with a notch 55 for reasons to be more fully explained hereinafter. The free-spooling means 50 also includes spring means such as the spring 57 mounted on the side wall 24 of the housing and engaging the side wall and lever 51 so as to bias the lever into the operative position, that is, to engage the pivot arm 42 of pawl 40 and hold pawl 40 out of engagement with the ratchet wheel 32, 33.

The free-spooling means 50 also comprises a trip arm 59 which may be received in the notch 55 of lever 51 in a manner to be described. The trip arm 59 is mounted on the vehicle, such as on the jamb, and is positioned for selective engagement with the lever. It will be understood that the trip arm may be integral with the jamb or otherwise formed as a part of the vehicle body or floor.

Figure 6:
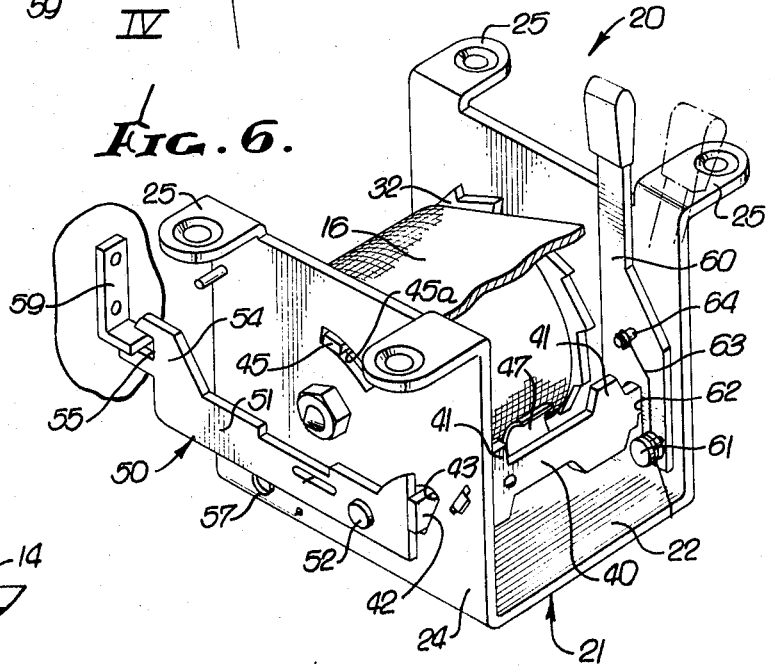
FIG. 6 is a perspective view as in FIG. 5 showing the free-spooling in the non-free-spooling condition.

In operation, and with particular reference to FIGS. 1, 3, 5 and 6, it will be seen that when the door is in the position shown in FIG. 1, the trip arm 59 is in engagement with the end 54 of the lever 51 as shown in FIG. 6. In this position, the end 53 of the lever 51 is out of engagement with the pawl pivot arm 42 so that the pawl is activatable in response to protraction and retraction of the straps as previously described. When the door is opened to the position shown in FIG. 3, the trip arm 59 moves the lever 51 to the position shown in FIG. 5 where the end 53 engages the pivot arm 42 of the pawl 40 moving the pawl tabs 41 out of engagement with the ratchet wheels 32, 33, thus permitting the reel 27 to free-spool in the counterclockwise direction (as viewed in FIG. 7) allowing the belt to be protracted. Thus, while it will be appreciated that the retractor is in the locked condition in the condition shown in FIG. 1, opening of the door will immediately cause the pawl to disengage the ratchet wheel and allow further protraction.

It should be noted that the lever 51 is pivotally mounted so as to provide considerable mechanical advantage in moving the pawl 40 since the pawl tabs 41 when engaging the teeth of the ratchet wheels 32, 33 will provide frictional resistance against movement and this must be overcome by leverage. Of course, there is considerable leverage in the door itself since the retractor is mounted at a considerably spaced apart distance from the hinge axis of the door so that considerable force will be applied to the free end 54 of the lever 51 as the door is being opened.

The vehicle safety restraint system may also include a manual override arm 60 pivotally mounted at its lower end by a pin 61. The lower end of the arm 60 is bifurcated to provide an opening 62 which, as seen best in FIGS. 5 and 6, receives the pivot arm portion 42 of the pawl 40. The arm is biased by a spring 63 supported on pin 61 and engaging the housing and a pin 64 on arm 60 so as to urge the pawl 40 toward the ratchet wheels 32, 33 in a manner previously described. In the event that the free-spooling means of the present invention should malfunction in any manner, the manual override arm 60 provides additional safety measure since the pawl may be manually moved out of engagement with the ratchet wheels to place the retractor in the free-spooling mode.

It will be seen from the foregoing description of the structure and operation of an exemplary embodiment of the present invention that all of the above-mentioned objects are accomplished by the instant system. Of course, modifications, alterations and variations of the vehicle safety restraint system may be made by persons skilled in the art which come within the scope of the present invention.

I claim:

1. In a passive safety restraint system for use in a vehicle having a seat and an adjacent door, the combination comprising:

an auto-lock retractor carried on the lower rearward corner portion of the door, the retractor comprising a housing, a reel mounted for rotation in said housing and around which a safety strap is wound when fully retracted and from which the strap may be protracted, ratchet wheel means fixedly mounted on the reel for rotation therewith, and locking means including a pivotally mounted pawl for selective engagement with the ratchet wheel means to prevent protraction of the strap after a pres-selected length of strap is protracted and permitted to slightly retract so that the reel is in a locked condition;

a lever pivotally mounted on said housing intermediate the ends thereof, one end of said lever in selective engagement with said pawl;

spring means biasing said lever to an operative position in engagement with said pawl whereby said pawl is inactivatable; and trip means fixedly mounted on the vehicle adjacent the lower rearward corner of the door for selective engagement with said lever, said trip means moving said lever to an inoperative position when the door is closed and moving said lever to said operative position when the door is opened, whereby said pawl is activatable in response to protraction and retraction when the door is closed and is inactivatable when the door is open so that upon opening of the door, the reel will free spool allowing the strap to be protracted.

2. The safety restraint system of claim 1 wherein said vehicle is provided with a door jamb extending inwardly from the exterior surface of the vehicle and into which the door fits and said trip means is mounted on the door jamb in an out-of-the-way position.

3. The vehicle safety restraint system of claim 1 wherein the opposite end of the safety strap is secured to the vehicle floor at a location spaced inwardly from the door whereby the strap circumscribes the lap of an occupant in the vehicle seat adjacent the door when the door is closed and wherein opening of the door causes protraction of the strap moving the downward end of the strap forwardly to permit side egress of the occupant out of the vehicle.

4. The safety restraint system of claim 2 additionally including a manually operable arm pivotally mounted on said housing, one end of said arm in engagement with the pawl, a spring biasing the arm to position and the pawl toward said ratchet wheel means, said arm being movable to move said pawl to an inactivatable position permitting free spooling of the retractor reel.

5. The safety restraint system of claim 4 additionally including a stop pin mounted on said retractor housing to limit pivotal movement of said lever.

6. The safety restraint system of claim 1 wherein the end of said lever is provided with a notch and said trip means comprises an arm receivable in said notch when the door is closed to prevent movement of said lever from said inoperative position when the door is closed.

* * * * *